Feb. 24, 1959
C. E. ANDERSON
2,874,437
PIPE HANGING APPARATUS
Filed March 28, 1955
2 Sheets-Sheet 1
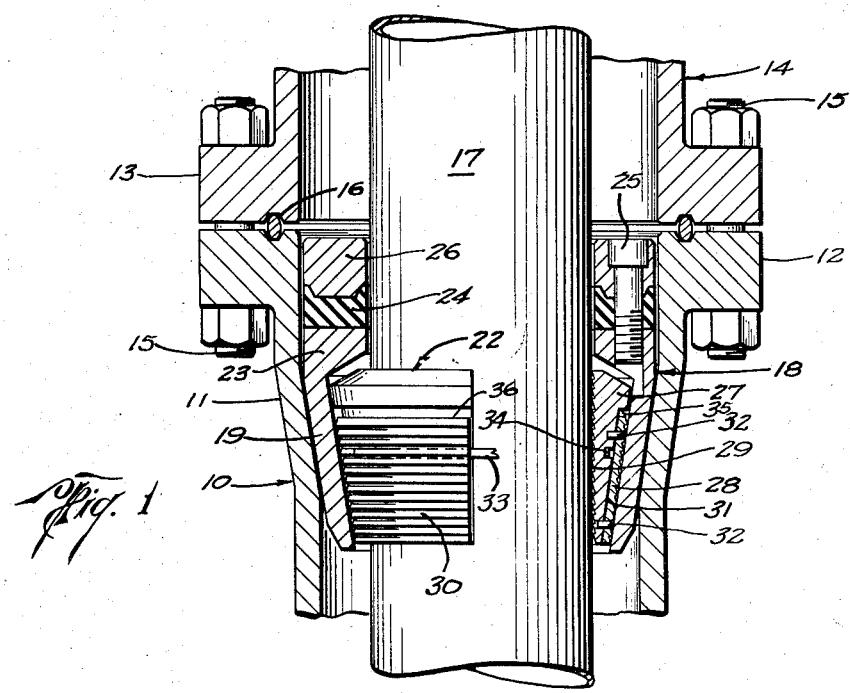
Fig. 1
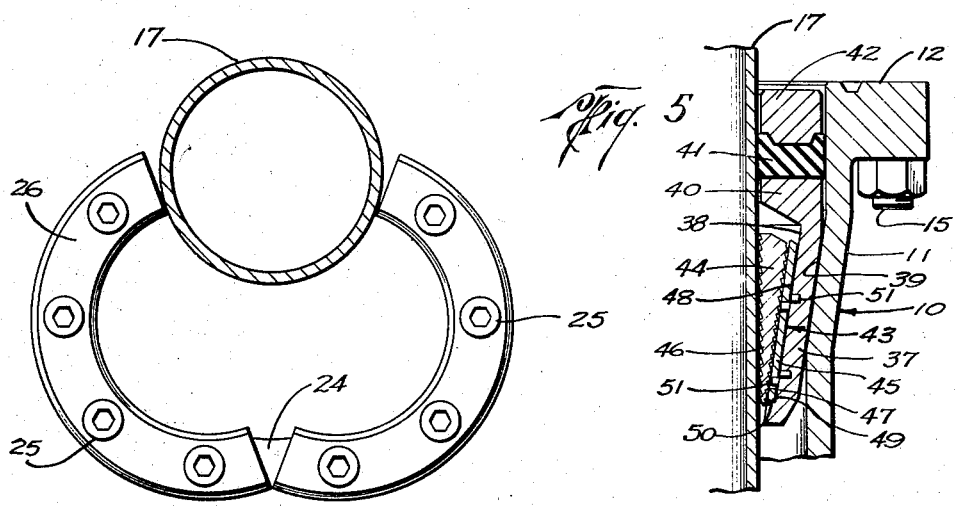
Fig. 2
Fig. 5
INVENTOR.
Clifford E. Anderson
BY
Browning, Simms & Hyer
ATTORNEYS

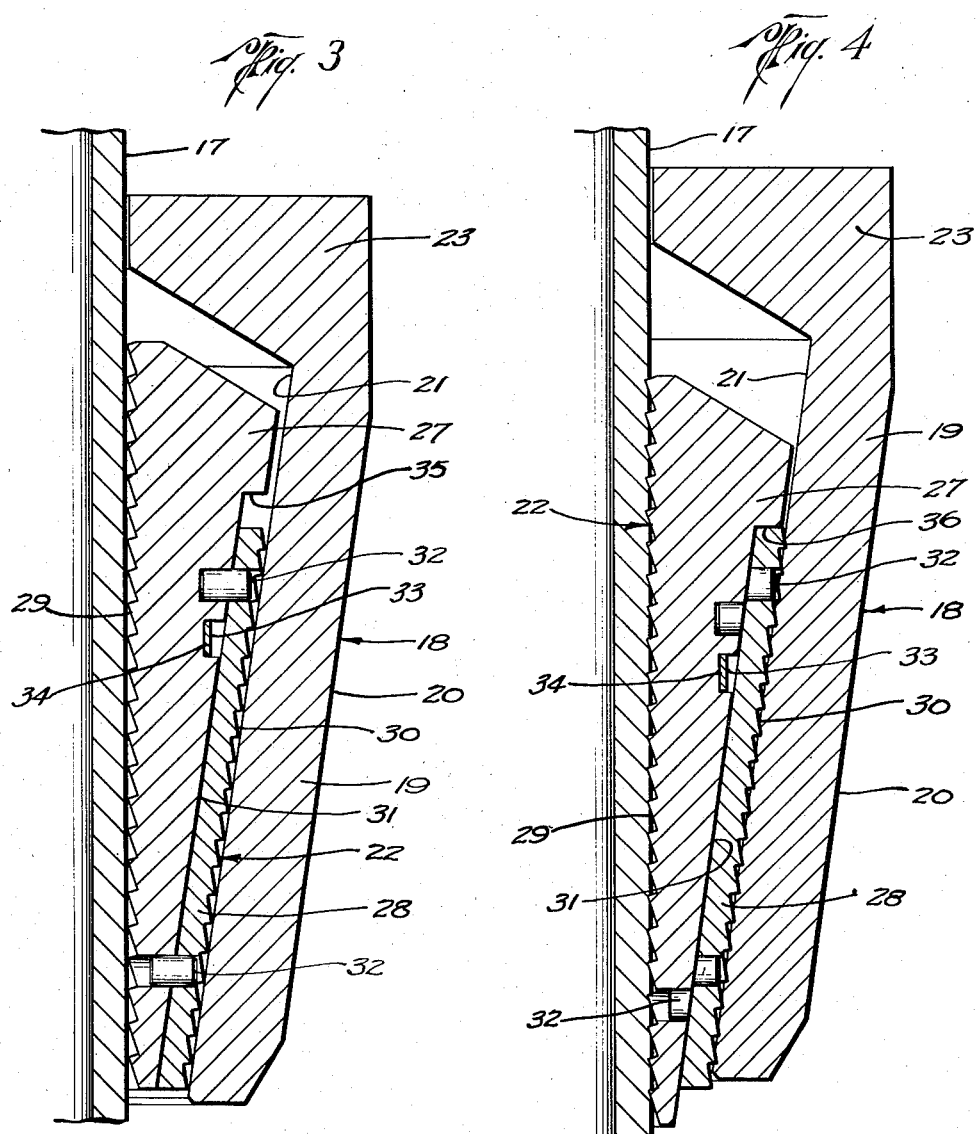

United States Patent Office 2,874,437
Patented Feb. 24, 1959

2,874,437
PIPE HANGING APPARATUS

Clifford E. Anderson, Houston, Tex., assignor to Cameron Iron Works, Inc., Houston, Tex., a corporation of Texas Application March 28, 1955, Serial No. 496,970

8 Claims. (Cl. 24—263)

This invention relates to improved apparatus for fixedly locating one member against movement in one directional sense relative to an oppositely facing and angularly disposed surface of another member. As such, this invention finds particular utility for hanging pipe within a tapered bowl of a well head fitting or the like.

It is common practice in completing a well to hang a pipe such as a casing within a casing head or similar well head fitting. Structures employed for this purpose have normally comprised wedge-shaped slip segments disposable between the pipe and a tapered bowl portion of the fitting. As shown, for example, in Patent No. 2,553,838 to Allen et al., the slips may be carried within a tapered bowl which is in turn disposable within the tapered bowl portion of a well head or similar fitting and carries suitable means for sealing between the pipe and fitting. While the inner surfaces of such slips are toothed for gripping the pipe as its weight is placed thereon, the outer slip surfaces are of low friction characteristics to permit downward sliding of the slip within the bowl into gripping engagement of the teeth with the pipe and for accommodating differing actual diameters of pipe of a given nominal diameter which may occur within manufacturing tolerances. As the full weight of the pipe is placed on the slips, they are tightly wedged between the pipe and bowl to grip and thereby hold the pipe.

One difficulty encountered in connection with these structures heretofore employed has been a tendency for the slips to grip the pipe 20 tightly as to "bottleneck" or reduce the diameter of the pipe as the full weight of the pipe is placed thereon, due to the fact that there has been in the past no way of controlling the amount of downward movement of the slips and hence of the compressive force exerted by the slips on the pipe. In other words, except for the strength of the pipe in resistance to collapse, there has been no limitation placed upon the amount that the slips may slide downwardly in the bowl as the weight of the pipe and in many cases force in addition to the weight of the pipe is placed thereon. As a result, the pipe has on occasion been bottlenecked by the slips to a degree which causes interference with operations carried on through the pipe.

It is an object of this invention to provide apparatus including wedge-shaped slip means which will positively control the compression exerted upon the member being fixedly located or hung so as to prevent collapse thereof.

Another object is to provide such apparatus which not only avoids excessive compression on the pipe or member being hung, but also insures that such pipe is firmly gripped regardless of differences in actual pipe diameter of given nominal diameter pipe within tolerances.

These and other objects are accomplished by providing, in combination with wedge-shaped slip means having teeth for gripping the one member to resist its movement in one directional sense and a low friction part slidable with respect to the oppositely facing member for permitting said teeth to move in said directional sense and in a path substantially parallel to the taper of the oppositely facing member as the weight of said one member is initially placed on the teeth, means including a part having higher frictional characteristics than the first-mentioned low friction part and movable relative to said low friction part from an initial position in which it will not substantially retard such sliding to one in which it will limit further downward movement of the teeth after a predetermined amount of such movement has taken place.

In accordance with this invention, the low friction part faces in substantially the opposite direction from the teeth. It may be slidably engageable either with the means which includes the high friction part or with the oppositely facing surface of the member which, in a well head pipe suspension is exemplified by the bowl. In the former alternative, the higher friction part is disposed for engagement with said surface of the member exemplified by the bowl and, in the latter alternative, is disposed for engagement with a surface of the low friction part.

A further object is to provide apparatus of the character above-described in which the slip means is made up of two relatively movable elements so arranged as to permit the member anchored by the slip means to be easily and readily removed from its fixed position.

A still further object is to provide apparatus of the character above-described in which the part having higher frictional characteristics is so disposed with respect to the oppositely facing surface of the bowl or corresponding member as to avoid any permanent defacing thereof.

Yet a further object is to provide apparatus including slip means which will accomplish any one or more of the foregoing objects and which is susceptible of the simplest and most economical fabrication of slip elements.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a sectional view of a conventional casing head with a casing hung therein by means of an illustrative embodiment of the apparatus of the present invention;

Fig. 2 is a top view of a part of the apparatus of Fig. 1 in the process of being disposed about the pipe;

Fig. 3 is an enlarged partial sectional view of the slip assembly of Fig. 1 just prior to the weight of the pipe being placed thereon;

Fig. 4 is a view similar to Fig. 3, but with the full weight of the pipe upon and carried by the slip assembly; and Fig. 5 is a partial sectional view of a casing head similar to that shown in Fig. 1, but with the casing hung from another illustrative embodiment of this invention.

It will be understood that the well head structure shown in the above drawings, and to be described below, is merely illustrative of one use for which the apparatus of the present invention is particularly well suited and should not be construed in a limiting sense upon the novel concepts of the invention. It is contemplated, for example, that the apparatus may be used for hanging pipe or other members with or without means for sealing about the members. As a further example, it will also be appreciated by those skilled in the art that this apparatus may be used in a tubing head or the like as well as in the casing head illustrated. In fact, it may be employed in any situation in which it is desired to anchor one member against movement in one directional sense and parallel to one of its faces, with respect to another member.

As it is shown in Fig. 1, this well head structure includes a casing head 10 of conventional construction having a tapered bowl portion 11. Above the bowl portion is a cylindrical portion having an outwardly extending flange 12 to which the flange 13 of another fitting 14, such as a blowout preventer or the like, may be secured by bolts 15. A seal ring 16 is fitted within opposed recesses in the flanges such that the fittings 10 and 14 may be sealed with respect to one another upon tightening of the bolts 15.

Extending within the bowl portion 11 of the casing head is a pipe such as casing 17 which is to be hung from and sealed with respect to the casing head by the apparatus designated in its entirety by numeral 18 and disposed between the pipe and the tapered bowl 11 and cylindrical portion of the casing head. The manner in which this apparatus is placed about the pipe and lowered within the casing head will be described hereinafter. It is sufficient to note at this point that, as shown in Fig. 1, the apparatus 18 is merely disposed about the pipe and supported upon the bowl portion 11. In this position, the weight of the pipe has not been placed upon the apparatus and there is merely a frictional engagement of one with the other.

The apparatus 18 comprises a bowl 19 having an outer tapered surface 20 to fit within casing head bowl portion 11 and an inner tapered surface 21 to receive slip means 22. Adjacent the cylindrical portion of the casing head, the upper part of the bowl 19 is provided with a ring-like support 23 for a deformable packing element 24 and is threaded to receive bolts 25 for securing a compressing ring 26 above the packing. As disclosed in the aforementioned Patent No. 2,553,838, the packing 24 may be compressed into sealing contact with the pipe and the casing head by tightening of the bolts 25.

The slip means 22 comprises a plurality of circumferentially arranged segments, each of which is made up of a body having inner and outer elements 27 and 28, respectively, the inner element 27 being disposed adjacent the pipe 17 and the outer element 28 between the inner element and the bowl 19. This assembly is provided with parts having high friction characteristics such as teeth 29 and 30 for resisting downward movement of the pipe within the assembly and the assembly within the bowl, respectively. More particularly, in the embodiment of Figs. 1, 3 and 4, the teeth 29 are disposed on the inner surface of element 27 and face upwardly to engage the pipe 17, and the teeth 30 are on the outer surface of element 28 and face downwardly to engage tapered bowl surface 21.

One of the slip elements 27 and 28 which together make up a complete slip is provided with a part having lower frictional characteristics than the high friction teeth 30. This part may be a relatively smooth surface 31. The two elements 27 and 28 are shaped and arranged for relative movement with respect to one another such that the inner element 27 having the pipe gripping teeth 29 is slidable downwardly with respect to the bowl by means of sliding of surface part 31 in a path substantially parallel to the bowl taper. For this purpose, the inner element 27 is substantially wedge-shaped in cross section with its outer surface being inclined downwardly toward its inner surface an amount corresponding to the angular relation of the tapered bowl surface 21 to the pipe 17 extending therein. With the inner and outer surfaces of outer element 28 being substantially parallel and disposed adjacent the outer surface of the element 27 and the inner surface of the tapered bowl, respectively, it can be seen that the afore-mentioned low friction part 31 on element 27 and teeth 29 on element 27 are slidable downwardly in the bowl with respect to the high friction part 30 which resists downward movement of the assembly within the bowl. More particularly, the smooth surface part 31 is slidably engageable with another low friction surface on the outer slip element 28. In the embodiment of Figs. 1, 3 and 4, it is the outer surface 31 of the inner element 27 which has low friction characteristics so as to slide downwardly with respect to the bowl while in engagement with the low friction inner surface of outer element 28.

The inner and outer elements 27 and 28 of each slip segment are releasably secured in a fixed position relative to one another by shear pins 32 as the slip means is disposed about the pipe 17 and prior to the weight of the pipe being placed thereon, as shown in Figs. 1 and 3. The several slip segments are held in fixed axial position relative to one another by means of a split spring ring or snap ring 33 within matching recesses 34 in the inner elements 27. With the slip means 22 thusly assembled, it will be understood that the entire assembly will slide downwardly in the bowl 19 so as to bring the teeth 29 and high friction surface 30 into initial frictional engagement with the casing 17 and inner bowl surface 21, respectively. Such sliding takes place without shearing of the pins 32 in a manner to permit the slip means to accommodate differing diameters of pipe.

As the weight of pipe 17 is initially placed upon the slip means, there will be a gripping of the pipe by the teeth 29 as well as a gripping of the inner bowl surface 21 by the teeth on the high friction part 30. Additional lowering of the pipe will develop two oppositely directed forces on the assembly. These oppositely directed forces are effective to shear the pins 32 so that the inner and outer slip elements are released from the afore-mentioned fixed position relative to each other and the inner element 27 upon which the teeth 29 are disposed will slide downwardly with respect to the bowl and relative to the element 28 upon which the high friction part 30 is disposed. This sliding will be in a path substantially parallel to the taper of inner bowl surface 21. It will be understood that such sliding movement of the low friction part 31 will cause the teeth of the high friction parts 29 and 30 to bite into and grip the pipe 17 and the inner bowl surface 21, respectively, as the slip means is wedged therebetween.

In accordance with the present invention, means are provided for limiting this downward movement of the teeth 29 to a predetermined amount such that the compression exerted upon the pipe 17 by the slip means 22 will be positively controlled to prevent excessive reduction of the inner diameter of such pipe. This means comprises abutment means for limiting the movement of inner element 27 relative to outer element 28 from their originally fixed position relative to one another, as shown in Fig. 3, to their relative position shown in Fig. 4 wherein the weight of the pipe 17 has been entirely placed upon the slip means and the pipe is hung within the fitting.

This abutment means comprises an abutment surface 35 on the inner element 27 which is engageable with a stop 36 on the outer element 28 carrying the low friction part 31 to limit downward movement of the teeth 29. Thus, the abutment surface is movable with the low friction part 31 from the position in which the weight of the pipe is initially placed on the slip means to the position in which the pipe is hung from the fitting.

It will be understood from the foregoing, that at the completion of this limited movement of the teeth 29, substantial additional downward movement of the pipe 17 within the fitting will be prevented. That is, when the elements 27 and 28 have reached the position of Fig. 4 in which no further sliding relative movement therebetween is permitted, the high friction parts 29 and 30 will permit no further downward movement of the casing except what may be necessary to cause the teeth 30 to engage sufficient metal of the bowl surface 21 to support the weight placed on the assembly. At the completion of the downward sliding movement of the element 27 relative to the element 28, the teeth 29 and 30 may be in such firm engagement that no further downward movement whatsoever is permitted. In any case, however, predetermined spacing of surface 35 from stop 36 provides a predetermined limit upon the extent that element 27 can move downwardly with respect to element 28 and hence provides a practical limitation on the degree to which the slip means may compress or bottleneck the pipe.

The other embodiment of this invention shown in Fig. 5 is also illustrated as used for hanging a casing 17 from a conventional casing head fitting 10 having a tapered bowl portion 11. Also, this embodiment is provided with apparatus disposable within the bowl portion 11, which appaartus includes a bowl 37 having inner and outer tapered surfaces 38 and 39, respectively, as well as a support 40 upon which sealing element 41 is disposed. Similarly to the embodiment of Figs. 1, 3 and 4, a compressing ring 42 is disposed above the sealing element 41 and bolts (not shown) may be used for compressing the same into sealing engagement with the pipe 17 and fitting 10. In Fig. 5, as distinguished from Fig. 1, the pipe 17 is shown in hung position from the fitting and the sealing element has been compressed into sealing position.

The slip means 43 of Fig. 5 is made up of inner and outer slip elements 44 and 45, respectively, having the same general cross-sectional shapes as the elements 27 and 28 of the slip means 22 of Fig. 1. Upwardly directed teeth 46 are disposed on the inner surface of inner element 44 for resisting downward movement of the pipe 17, and a high friction part 47 is disposed on the outer surface of inner element 44 for resisting downward movement of the teeth 46 with respect to the bowl. A part having lower frictional characteristics, in the form of a relatively smooth surface 48, is disposed on the outer surface of the outer element 45, while an abutment surface 49 is provided on the element 45 in position for engagement with a stop 50 on an inwardly directed shoulder upon inner bowl surface 38.

In the position prior to placing of the weight of the pipe upon the slip means, the outer element 45 is held by shear pins 51 in fixed position with respect to the bowl 37 and with the abutment surface 49 a predetermined distance from its oppositely facing stop 50. In this position, the inner element 44 is permitted to accommodate the slip means to varying diameters of pipe inasmuch as teeth 46 may slide relative to pipe 17 and high friction part 47 relative to a smooth inner surface on outer element 45.

As the weight of the pipe 17 is placed upon the slip means, there will be an initial frictional engagement of the pipe with teeth 46 and high friction part 47 with outer element 45. The oppositely directed forces thus set up are effective to shear the pins 51 so that the low friction part 48 and the teeth 46 slide downwardly as a unit in the bowl to wedge the slip means 43 into firm engagement with the pipe. As described in connection with the other embodiment of this invention, this downward sliding movement of the teeth 46 is limited to a predetermined amount, i. e., the spacing of surface 49 from stop 50 prior to shearing of pins 51, and at the termination of such sliding, there will be no further substantial downward movement of the pipe 17 within the fitting.

It can be seen from Fig. 2 that the bowl 19 is composed of two or more parts hinged together by the deformable sealing element 24 to permit the bowl and the slip means carried thereby to be wrapped around the pipe 17. Of course, suitable means (not shown) may be provided for latching the bowl parts in pipe surrounding position. Also, a pin may be provided through the tapered portion of the bowl 19 for holding the slip means in a position with the teeth 29 outside of the inner periphery of the cylindrical portion of the bowl made up of support 23, sealing element 24, and compressing ring 26. In this manner, the teeth are held out of engagement with the pipe until removal of the pin, at which time the slip means drops downwardly between the pipe and bowl to accommodate itself to the pipe diameter, in a manner previously described.

In actual practice, the casing 17 is run into the well through the blowout preventer 14 and other control equipment to a position where it is to be hung and sealed. While the casing is suspended by suitable hoisting apparatus, the above-described assembly is placed thereabout and the blowout preventer is opened to permit the assembly to be lowered into the position shown in Fig. 1 wherein the bowl 19 rests upon the inner tapered portion of the fitting. At this time, the weight of the casing may be eased off of the hoisting apparatus and lowered onto the slip means, whereby the casing is hung and sealing between the casing and fitting is accomplished in the manner previously described.

When hung by the novel apparatus of the present invention, the pipe 17 is easily and readily removable from the fitting 10 by means of an upward pull exerted on the pipe. Although in each embodiment of the apparatus there is a part having high friction characteristics (part 30 in Figs. 1, 3 and 4 and part 47 in Fig. 5) which would normally resist such an upwardly directed force, the construction of the slip means is such that this force is immediately effective to relieve this resistance. That is, an upwardly directed force is effective in each embodiment to cause the low friction part to slide upwardly relative to the bowl, whereby compression on the pipe is lessened and the afore-mentioned high friction parts are disengageable from their oppositely facing relatively smooth surfaces.

To be more specific, in the embodiment of Figs. 1, 3 and 4, an upward pull on the pipe causes the low friction part 31 to slide upwardly in the bowl and relative to outer element 28, such that the teeth of high friction part 30 are easily disengageable from inner bowl surface 21. In like manner, in the embodiment of Fig. 5, pulling of the pipe upwardly causes part 48 to slide upwardly to a point where the teeth of high friction part 47 are easily disengageable from the inner surface of outer slip element 45.

Further advantages are enabled by the embodiment of Fig. 5 wherein both high friction parts are disposed on the same slip element. For one thing, such a construction of the slip means makes possible a less costly fabrication inasmuch as only one such element need be hardened. Also, it is apparent that neither of the high friction parts is engageable with the bowl, as a result of which the bowl 37 is not subject to defacing by teeth on such high friction parts and need not be replaced from one hanging operation to another.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for fixedly locating one member against movement in one directional sense relative to an oppositely facing and angularly disposed surface of another member, comprising wedge-shaped slip means disposable within the tapered space between said members and having teeth on an inner surface thereof for gripping said one member to resist its movement in said one directional sense, a part on said slip means presenting an outwardly facing surface having an angular disposition relative to said toothed surface for sliding in said one directional sense relative to said oppositely facing surface of said other member and inwardly toward said one member as said one member is gripped by said teeth, said outwardly facing surface and said toothed surface being movable with one another during such sliding to force said teeth into more tightly gripping relation with said one member, and means including another part on said slip means presenting a surface having greater resistance to movement of said teeth in said one directional sense than said first-mentioned part, said other part being movable, in response to a predetermined movement of said one member, from one position relative to said first mentioned part in which the surface thereon is ineffective to resist movement of the one member to another position in which said surface thereon is effective to increase the resistance to movement of said one member in said one directional sense.

2. Apparatus of the character defined in claim 1, wherein said slip means includes an inner element having said teeth thereon, and an outer element between said inner element and said other member, said first-mentioned part being disposed on the outer surface of one of said elements, and said second-mentioned part being disposed on the outer surface of the other of said elements.

3. Apparatus of the character defined in claim 2, wherein said first-mentioned part is disposed on said inner element for sliding over the inner surface of said outer element, and said second-mentioned part is disposed on said outer element for gripping said surface of said other member.

4. Apparatus of the character defined in claim 3, wherein said first-mentioned part is disposed on said outer element for sliding over said surface of said other member, and said second-mentioned part is disposed on said inner element for gripping the inner surface of said outer element.

5. Apparatus for hanging a pipe, comprising an annular bowl having a downwardly and inwardly tapered seat, wedge-shaped slip means disposable within the tapered space between said pipe and bowl and having teeth on an inner surface thereof for gripping said pipe to resist its downward movement, a part on said slip means presenting an outwardly facing surface having an angular disposition relative to said toothed surface for sliding downwardly in the bowl and inwardly toward said pipe as said pipe is gripped by said teeth, said outwardly facing surface and said toothed surface being movable with one another during such sliding to force said teeth into more tightly gripping relation with said pipe, and means including another part on said slip means presenting a surface having greater resistance to movement of said teeth downwardly within the bowl than said first-mentioned part, said other part being movable, in response to a predetermined movement of said pipe from one position relative to said first-mentioned part in which the surface thereon is ineffective to resist downward movement of the pipe to another position in which said surface thereon is effective to increase the resistance to downward movement of said pipe.

6. Apparatus of the character defined in claim 5, wherein said slip means includes an inner element having said teeth thereon, and an outer element between said inner element and said bowl, said first-mentioned part being disposed on the outer surface of one of said elements, and said second-mentioned part being disposed on the outer surface of the other of said elements.

7. Apparatus of the character defined in claim 6, including a stop on the outer element, and an abutment on the inner element engageable with the stop to limit sliding of said first-mentioned part.

8. Apparatus of the character defined in claim 6, including a stop on the bowl, and an abutment on the outer element engageable with the stop to limit sliding of said first-mentioned part.

References Cited in the file of this patent
UNITED STATES PATENTS

| | | |
|---|---|---|
| 1,634,917 | Sheldon | July 5, 1927 |
| 1,786,407 | Humanson | Dec. 23, 1930 |
| 2,017,600 | Lofton | Oct. 15, 1935 |
| 2,230,712 | Bendeler et al. | Feb. 4, 1941 |
| 2,553,838 | Allen | May 22, 1951 |
| 2,563,851 | Lundeen et al. | Aug. 14, 1951 |
| 2,589,483 | Eckel et al. | Mar. 18, 1952 |
| 2,683,045 | Brooks | July 6, 1954 |
| 2,683,046 | Allen | July 6, 1954 |